Nov. 11, 1952 — D. C. PORTER — 2,617,483
AUTOMATIC ELECTRONIC CONTROL MECHANISM
Filed Oct. 8, 1947 — 5 Sheets-Sheet 1

INVENTOR.
Donald C. Porter
BY
Arnold and Mathis
ATTORNEYS Nov. 11, 1952  D. C. PORTER  2,617,483
AUTOMATIC ELECTRONIC CONTROL MECHANISM
Filed Oct. 8, 1947  5 Sheets-Sheet 2

INVENTOR.
Donald C. Porter
BY
Arnold and Mattis
ATTORNEYS

Nov. 11, 1952     D. C. PORTER     2,617,483
AUTOMATIC ELECTRONIC CONTROL MECHANISM
Filed Oct. 8, 1947     5 Sheets-Sheet 3

INVENTOR.
Donald C. Porter
BY
ATTORNEYS

Fig. 16

Patented Nov. 11, 1952

2,617,483

UNITED STATES PATENT OFFICE 2,617,483

AUTOMATIC ELECTRONIC CONTROL MECHANISM

Donald C. Porter, Tacoma, Wash.

Application October 8, 1947, Serial No. 778,705

15 Claims. (Cl. 164—48)

My invention relates to an automatic electronic control mechanism.

More particularly, my invention relates to an automatic electronic control mechanism which is operated by the product being processed. For example, the stock being processed may be such as requires being severed into units of predetermined varying or uniform dimensions, and as it is conveyed on belts, the advancing edge of the stock is employed to trip the clipper or knife mechanism by intercepting a light beam. In short, under such circumstances, the device of my invention becomes an electrical measuring device.

For purposes of clearness and definiteness, I shall describe my invention as applied to metering plywood laminae or veneer sheets in connection with mechanism for clipping the same into panels of predetermined dimensions, varying or uniform. However, it is to be understood that my invention is not limited to any such specific application, but is applicable to all situations where the same conditions obtain in whole or in part.

In the manufacture of plywood panels (i. e., the assembly of veneer pieces), the veneer or plywood laminae sheet is peeled from the log, being rotary cut, and is conveyed from the peeling mechanism by suitable conveyor means, as belts, in a long continuous sheet, or strip. The continuous sheet, as it comes from the peeler, is commonly six, eight, ten or twelve feet in width and is to be cut by the clipper knife into panels, when quality permits, 48" finished width, and six, eight, ten or twelve feet long. The width of the continuous peeled sheet forms the six, eight, ten or twelve feet length of the plywood panel unit. Common widths of the clipped veneer sheet between imperfections are such dimensions that multiple units will add, for example, to 48" finished. The said continuous sheet of veneer as it comes from the peeler mechanism, has certain imperfections resulting from various causes such as knots, and these portions having imperfections must be removed. For this purpose, a clipper is operated to cut two 24" or one 12" and one 36" or three 16" widths of the veneer sheet to make 48" total width when the said veneer clipped pieces are assembled into the finished plywood panel. The clipped width as 24", 12", 36" and 16" are all finished dimensions without allowance for shrinkage or trim, so that actually the cut is enough larger to allow for said shrinkage and trimming. The clipper cuts crosswise of the sheet and, therefore, cuts out strips six, eight, ten or twelve feet wide. For purposes of description herein, we will hereinafter assume that the plywood laminae or veneer sheet is peeled from a log eight feet in length. The width of the scrap strip varies according to the width of the imperfection. It is, therefore, exceedingly important that the clipper cut as close as possible to each side of the imperfection so as not to waste more of the stock than is necessary. It will be understood that the sheet of veneer or plywood laminae ordinarily travels at a rate of 90 to 110 feet per minute, but with my invention this speed has been increased to 125 to 140 feet per minute, with increased accuracy and economy of dimensional cuts. The clipping operation may occur as often as thirty-six (36) times per minutes, or more, in connection with cutting out imperfections and cutting the panels; therefore, any failure to cut at the proper location causes a great waste of material.

Accordingly, a primary purpose of my invention is to avoid waste by providing as one feature, a clipper control means which will operate the clipper substantially instantaneously so that there is little or no lapse of time between the operation of the clipper and the time when the clipper mechanism is set in operation for clipping.

Prior devices which have been proposed to measure the panel and operate the knife to provide such dimensional cuts have had serious objections. A roller has been provided for such metering whereby when said roller contacts the wood it is revolved and its perimeter is employed as a metering means to determine the dimension; however, in such device, slippage is involved. The plywood sheet being wet, other inaccuracies arise besides slippage: for example, non-uniformity of feed and irregularities in thickness of the sheet arising where a detached chip may engage such prior art roller causing the same to jump or slip. Further objection arises from tearing the surface of the plywood laminae as occurs when a toothed roller is employed to avoid slippage. Thus, a further primary object of my invention is to provide a means which is entirely independent of non-uniformity of feed of the sheet, as well as independent of slippage.

A still further primary object of my invention is to provide a clipper control mechanism which, when desired, may be operated automatically by the advancing sheet of veneer whereby human control and delay incident to nerve responses may be eliminated.

A further primary object of my invention is to provide for an electronic control mechanism which embodies a single electronic cell subject to being operated by a plurality of lighting means or lamps through the intermediate means of light reflectors.

A further primary object of my invention is to provide an electronic control means which provides for a plurality of units of different metered dimensions and at the same time the units are movable in such spaced relation to each other that the control mechanism operates only when said spaced relationship is of a predetermined magnitude. That is, all the lamps are energized up to and including the desired dimensions or distance from the clipper knife as will be hereinafter more fully set forth.

The clipper mechanism is operated by an operator standing alongside the moving control sheet. That portion of the sheet which contains the imperfection is removed by cutting out a section or piece measuring approximately the width of the imperfection and the width of the veneer sheet as peeled. To avoid wastage of the product it is thus obvious that it is important that the clipper should be subject to precise control so that the panels of greatest clear width (measured longitudinally of advancing sheet) shall be obtained. At the present time, the operation of the clipper results in great wastage of the peeled veneer sheet, i. e., stock which represents considerable investment and is relatively valuable being from selected logs characterized by their clear grain, uniformity of fiber and size. These peeling logs, it will be understood, moreover, are only that portion of the tree having the minimum of limbs because limbs mean knots in the peeled veneer sheet.

As stated above, the single sheet must be cut into predetermined sizes as set forth. These, it will be understood, are finished dimensions, as explained above, when the veneer pieces are laid up or assembled into plywood products or panel.

The feeding means employed with my invention, causing the sheet to travel is not stopped at the time of the engagement of the clipper knife with the sheet during the moment of clipping. However, there is a momentary stoppage by the knife (even though operating "instantaneously") of the sheet which causes a slight bulging in the sheet, and then the sheet continues on its course as soon as the knife is raised from engagement with the sheet, and the bulge then straightens out. The average number of clips per minute is about 36. With a necessarily involved wastage of some two inches per clip with some commonly employed prior art devices, it is evident that two times 36 makes 72 inches, and 72 divided by 12 gives 6 lineal feet. In other words, there is a wastage of six lineal feet per minute. The 6 feet wastage is in line of travel, and there is the width of the single sheet coming from the peeled log which may be about six, eight, ten or twelve feet. Taking 8 feet times 6 feet, in linear direction of travel, we have 48 square feet of veneer wastage per minute. Multiplying this by 480 minutes per day we have some 23,000 square feet of veneer or plywood laminae of highly valuable stock wasted per day.

It is my object to provide a machine which can cut to a small fraction of an inch in error as opposed to two inches by such commonly employed machines. The reason for even the small wastage in my invention is due to the fact that the clipper knife, as presently constructed, cannot reciprocate more readily; also, due to the fact that the clipper knife is not constant in its operation, that is, not uniform. It has an air cushion to take up the shock of its reciprocating movement, and this provides a varying length of stroke which upsets the precise and uniform timing of the instrument, permitting the slight error. My control mechanism reduces this error to such a small magnitude that it is considered zero in practical operation. The control mechanism of my invention is instantaneous, being governed by the advancing sheet itself.

Some of the older clipping mechanisms do have intermittent travel of the plywood sheet and, accordingly, the production is reduced by that amount. However, the more modern devices do not have intermittent action. An object of my invention is to provide for operating upon either intermittent or continuous runs of the feed belt carrying the stock; that is, the plywood laminae or veneer sheets. This is accomplished in my invention by causing the operation of the clipper knife and the start and travel of the feed belt in same sequence by the advancing sheet.

Accordingly, a fundamental purpose of my invention is to overcome the objections of such wasteful operation as is set forth hereinabove and to provide automatic control mechanism for the clipper which will cause the clipper to operate with precision by the veneer sheet itself.

A primary object of my invention is to provide a means of measuring the predetermined width of a panel without any mechanical, physical, contact with said veneer sheet, whereby slippage incident to roller metering means, side drag difficulties, causing breaking of the sheet, and jumping of any roller means due to chips which may have fallen upon the sheet, or any slippage due to the wetness of the sheets or the pressure of the roller breaking bulged portions of the laminae, are eliminated.

The above mentioned general objects of my invention, together with others inherent in the same, are attained by the mechanism illustrated in the following drawings, the same being preferred exemplary forms of embodiment of my invention, throughout which drawings like reference numerals indicate like parts.

Figure 1:
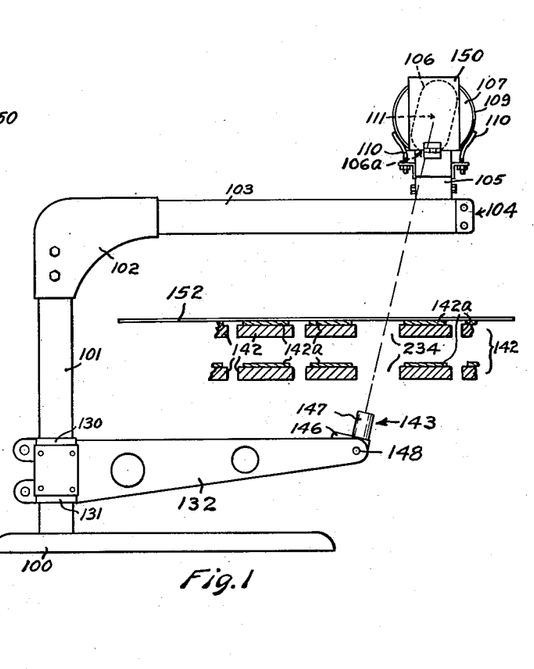
Figure 1 is a view in side elevation of the device embodying my invention, the device being positioned alongside of the off-bear belt from the knife.
Figures 5, 6, 8, 15:
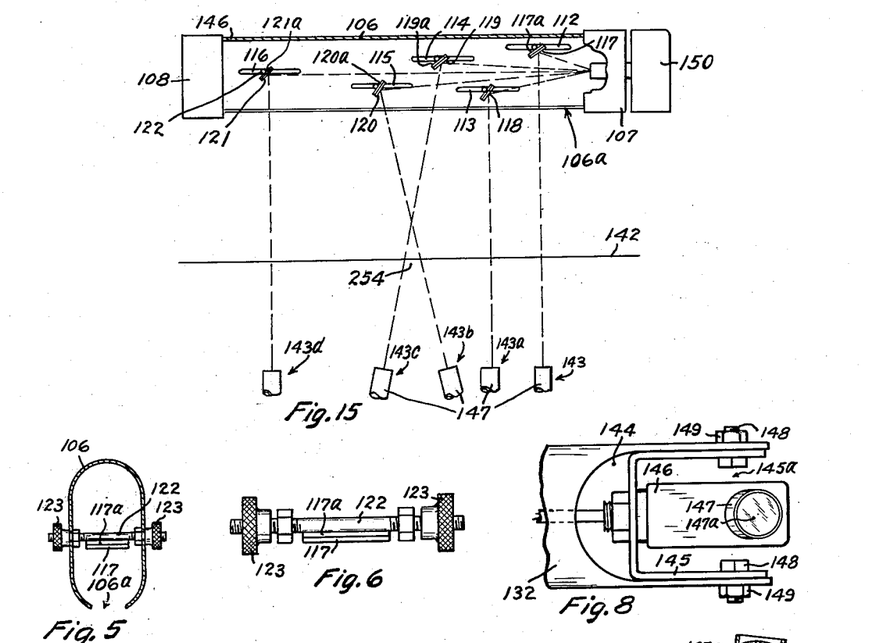
Fig. 5 is a view in cross section on dotted line 5 of Fig. 4.
Fig. 6 is a view in detail of the light beam deflector-mounting means.
Fig. 8 is an enlarged view in plan of the device of Fig. 7.
Fig. 15 is a view illustrating how the light beams may be crossed to provide lengths of panels intermediate the settings of the lights.

The device has a mounting frame having foot supports 100 and 100a which mount upstanding columns, or posts, 101 and 101a. Each column 101 and 101a supports an elbow 102 and 102a into which elbows are inserted upper extension arms 103 and 103a, respectively. Each of the extension arms carries on its end clamps 104 and 104a (not shown), which act as mounting means for a short vertical member 105 and 105a on which is mounted the light collector and oval form (cross section) selector housing 106 having drums 107 and 108 integrally formed on the ends thereof. Brake-like bands 109 secure the drums 107 and 108 to members 105. Bands 109 have adjustable securing bolts 110 welded thereto. The light collector and selector housing 106, Fig. 1 dotted line and Fig. 5, is preferably of general oval-like form and has longitudinal axis 111 which axis is also the axis of each of the drums 107 and 108. Axis 111 passes through the focal point of the photoelectric cell prism collector so that rotation of the housing 106 at all times maintains the radius relation of light deflectors hereinafter described as mounted in slots of said housing with the axis 111 whereby the angle of deflection remains constant when in a plane with the light beams of lamps hereinafter described. Drums 107 and 108, in connection with brake-like bands 109, render the light collector and selector housing 106 angularly adjustable to plane of light beams of said lamps, as stated, to be hereinafter described. The light collector and selector housing 106 has along its bottom portion a slot 106a, Figs. 1 and 5, functioning as an aperture for the reception of light beams only, hereinafter described, i. e., other light is substantially excluded.

Figure 2:
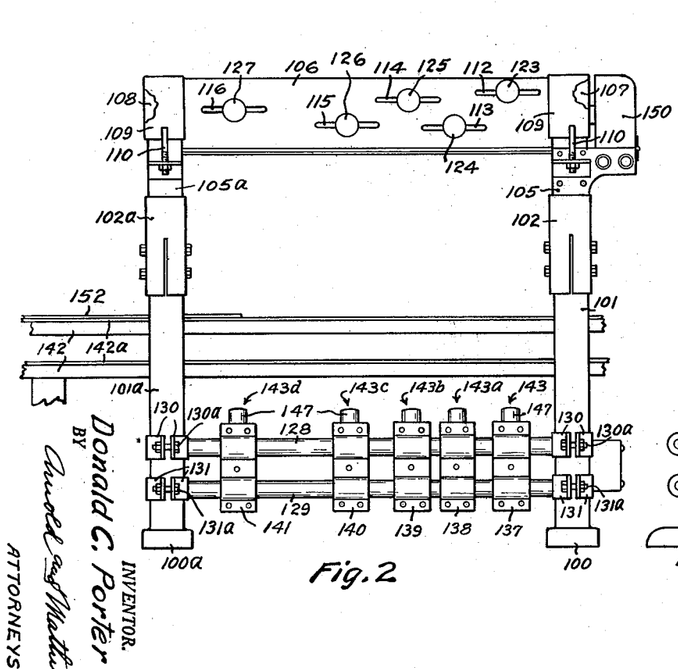
Fig. 2 is a view in longitudinal elevation.
Figure 3:
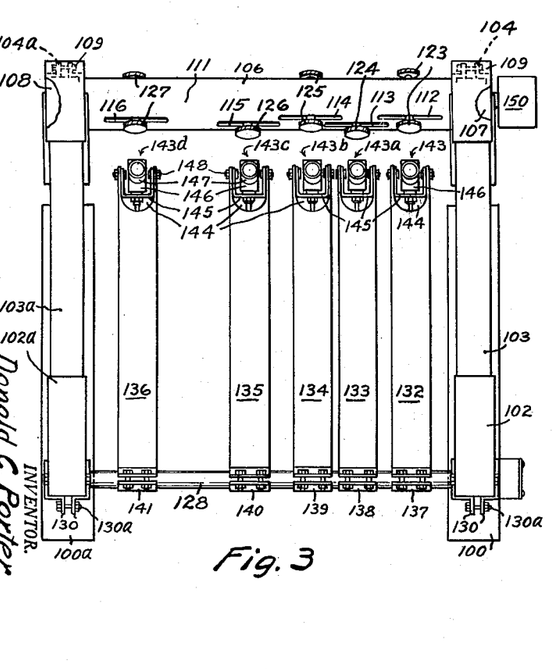
Fig. 3 is a plan view of the device shown in Fig. 1.

On each side of the light collector and selector housing 106 are oppositely disposed slots as 112, 113, 114, 115 and 116, i. e., said slots are arranged in pairs, Fig. 2. In these slots are mounted light deflecting mirrors 117, 118, 119, 120 and 121. These deflector mirrors may be mounted in any suitable manner as by rubber cement on steel plates 117a, 118a, 119a, 120a and 121a, which are welded to rods 122, Figs. 4 and 6. These deflector means are mounted identically as respects each other and on each of the ends of rods 122 are threaded knurled locking nuts 123, 124, 125, 126 and 127 for holding said rods in place in their respective slots. Since said slots, Fig. 4, have different location with respect to axis 111, in order that deflected light means having different angles of incidence will clear the others, knurled nuts 124 and 126 do not appear in Fig. 3.

Figure 7:
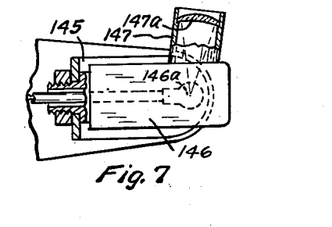
Fig. 7 is an enlarged view in side elevation of the light mounting saddle.

Upright members 101 and 101a are joined together at their base by two pipes 128 and 129, Fig. 2. These pipes have integrally formed on their end portions joined band clamps 130 and 131, respectively. These clamps 130 and 131 have bolts 130a and 131a for making the clamps tight on their respective uprights. Upon pipes 128 and 129 are mounted lamp mounting arms 132, 133, 134, 135 and 136, Fig. 3. These lamp mounting arms have clamping plates 137, 138, 139, 140 and 141, respectively, so that the lamp mounting arms may be clamped securely to rods 128 and 129. This mounting provides for horizontal sliding of the lamp mounting arms upon the cross pipes 128 and 129, Fig. 2, but, however, always maintain its lamp arm at a definite elevation as respects slotted table 142, Fig. 1, for supporting conveyor belt 142a. On the opposite ends of lamp mounting arms 132 to 136, inclusive, are located lamp means 143, 143a, 143b, 143c and 143d, each of which have identical construction, Figs. 2 and 3. A cutout portion 144 leaving an opening in the end of each of the lamp mounting arms is provided. In this opening 144, a cradle 145, Figs. 7 and 8, functioning as a mounting for said lamp means, is adjustably swingingly mounted so as to permit the cradle to swing in a vertical plane on pivots 145a. Lamp means 143 has a lamp housing 146 which is rotatively mounted in this cradle 145 in an axis normal to that of the cradle so that it can revolve in a plane normal to that of the cradle 145 thereby providing universal adjustment. In this lamp housing 146 there is mounted an electric light bulb, or lamp, 146a, and secured to the light housing 146 is a light focusing tube 147 with a light concentrating focusing lens 147a, Fig. 7. A bolt 148 having clamping nuts 149 is pivotally mounted to the light housing cradle 145 so that the cradle can be adjustably rotated and held in the vertical plane to adjust the light beams of the lamps 146a with respect to the light deflecting means 117, 118, 119, 120 and 121, Fig. 4.

Drums 107 and 108 in connection with brake-like bands 109 render the light collector and selector housing 106 angularly adjustable to the plane of light beams from said lamp means 143.

Pipes 128 and 129, respectively, may be adjusted vertically by means of clamps 130 and 131, thus changing their spaced relation with respect to the table 142.

Figure 4:
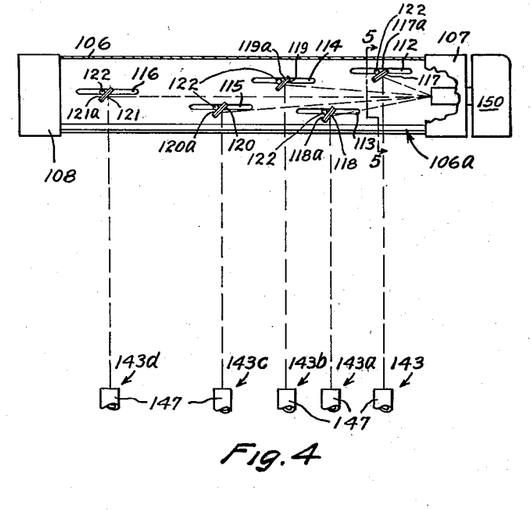
Fig. 4 is a longitudinal view of the light selector and collector box with part broken away showing deflection of a plurality of light beams from the lamps to a single photoelectric cell.

Referring in general to Fig. 4, on post 105 carried by arm 103, Fig. 2, (that is, the arm furthest from the clipper mechanism hereinafter described) there is mounted a conventional electronic unit 150 comprising a photoelectric cell prism, and relay, the photoelectric cell being actuated by a light beam, the current thereby created being rectified by an electronic tube, and this current in turn operating a relay mechanism —said unit being conventional and therefore shown only schematically. Between the peeler log 150a from which the veneer sheet 152 is peeled and the clipper electronic control mechanism of my invention, there is located a clipper mechanism 151, Fig. 9. It will be understood that the sheet of veneer 152 is carried by in-bear belts 153 to the clipper off-bear belts 142a supported by a slotted table means 142.

Figure 9:
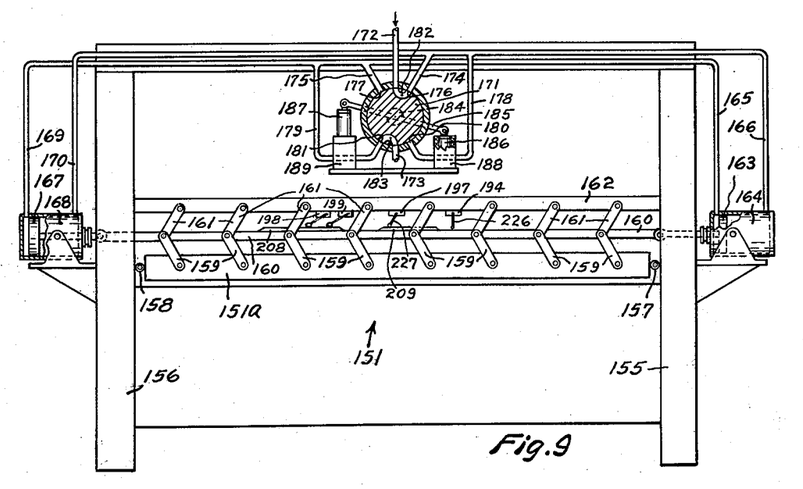
Fig. 9 is a schematic drawing of a clipper knife mechanism showing compressed air actuating means connected to the draw bar of said clipper knife and conventional four-way rotary valve.

The clipper means, Fig. 9 (same forms no part of my invention) comprises a knife 151a mounted between guides 155 and 156. Rollers 157 and 158 may be disposed between the ends of the knife 151a and said guides. This knife is mounted on toggle links 159 pivotally secured to said knife at one end of said links. The other end of said links is fastened to a draw bar 160. Second links 161 are pivotally mounted to said draw bar at a common pivotal point with links 159. This second link is also pivotally mounted on a fixed bar 162. At each end of the draw bar 160 is a piston 163 ("right hand") operating in cylinder 164. This cylinder 164 is alternately supplied with compressed fluid, as air, supplied by conduits 165 and 166. At the opposite end of draw bar 160 is piston 167 operating in cylinder 168 ("left hand") which is likewise supplied with compressed fluid, as air, through pipes 169 and 170. The compressed fluid is controlled by rotary valve 171 to which intake pipe 172 conveys the compressed fluid, and pipe 173 forms the exhaust from said rotary valve 171. Pipes 174 and 175 selectively connect with ports 176 and 177 respectively in rotary valve 171. Likewise pipes 178 and 179 respectively selectively connect with ports 180 and 181 in rotary valve 171. Rotary valve 171 has passageways 182 and 183. The rotary valve 171 is mounted on shaft 184 and on this shaft is keyed a lever arm 185 on the ends of which are pivotally connected solenoid cores 186 and 187 for operation within solenoids 188 and 189 respectively.

Figure 10:
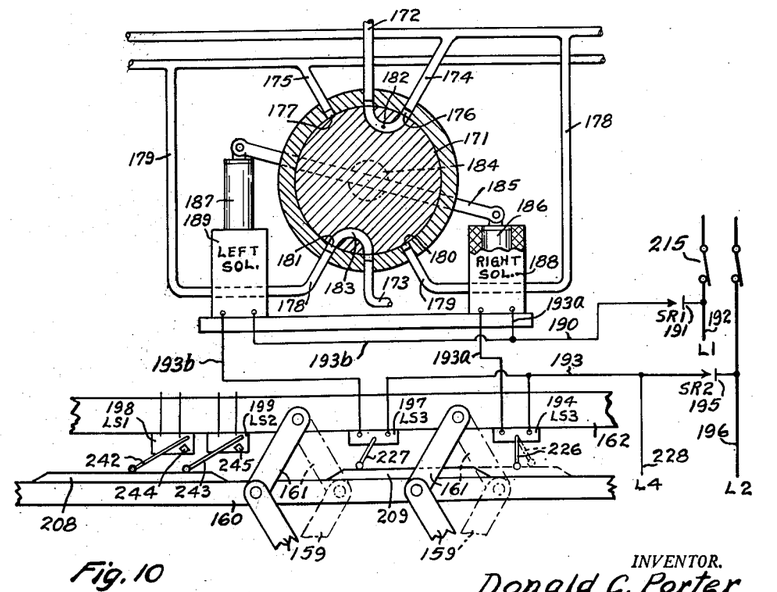
Fig. 10 is a schematic drawing of the rotary valve, attached solenoids, the reversing switches for said clipper knife draw bar, and wiring connections to the control box wiring diagram of Fig. 16.

Solenoid 188 (right), Fig. 10, and solenoid 189 (left) are connected by common conductor 190 which continues through relay normally open contact 191 (S.R.1 of wiring diagram, Fig. 16) to main supply line 192 (L.1). The other leg of solenoid 188 (right) is connected by conductor 193 in series with reversing switch 194 (right) through relay normally open contact 195 (S.R.2) to main supply line 196 (L.2). Conductor 193 is common conductor between reversing switch 194 (L.S.3) (normally open) and reversing switch 197 (L.S.3) (normally open) and counter line 228 (L.4) and normally open relay contact 195 (S.R.2) and supply line 196 (L.2). Conductor 193a connects the right solenoid 188 with conductor 190 and reversing switch (right) 194 (L.S.3). Conductor 193b connects left solenoid 189 with conductor 190 and with reversing switch 197 (L.S.3) normally open. When draw bar 160 is in left position, reversing switch 197 (L.S.3) is closed and reversing switch 194 (L.S.3) is open, and vice-versa when draw bar 160 is in opposite (right) position. Reversing switches 194 (L.S.3) and 197 (L.S.3) have respectively contact arms 226 and 227 which engage projecting bevelled platform 209 carried by draw bar 160.

As respects limit switches 198 (L.S.1) and 199 (L.S.2), when draw bar 160 is at either end of stroke (i. e., when knife 151a is raised) limit switches 198 (L.S.1) and 199 (L.S.2) are closed, i. e., they hold all preset relays hereinafter described in connection with wiring diagram of control box 200, Fig. 16, which box has control panel 201. As an example of one of said preset relays we may refer to relay 229 (2.R) being held by its contact 230 (2.R.1) when push button 210b has been pressed to energize coil to close relay 230 (2.R.1). When the draw bar 160 is in intermediate position (knife 151a at bottom of stroke), then limit switches 198 (L.S.1) and 199 (L.S.2) momentarily open allowing held relays to drop out, that is, when limit switch 199 (L.S.2) opens then that de-energizes relay 229 (2.R) which returns contact 230 (2.R.1) to its normally open position. Thus is prevented repeated operation of the size represented by light 143c (2.L) where we have simple single selective operation. Said limit switch 198 (L.S.1) is connected by conductor 202 in series with main supply line 192 (L.1) through normally open relay contact 204 (A.R.1) through relay 205 (A.R.) to main supply line 196 (L.2). Said limit switch 199 (L.S.2) is connected by conductor 203 in series on one side with main supply line 192 (L.1) and on the other side said conductor 203 passes through a connection with secondary line 206 (L.3) and through light 143d (1.L) to main supply line 196 (L.2). Said limit switches 198 (L.S.1) and 199 (L.S.2) have arms 242 and 243 which are held at angle by stops 244 and 245 so that they are operated by engaging projecting platform 208 attached to draw bar 160. When this draw bar 160 is raised at either end of its stroke these limit switches 198 (L.S.1) and 199 (L.S.2) are closed, which means that current conductors 202 and 203 are energized excepting as their connecting conductors are otherwise interrupted.

A three-contact relay 246 (1.R.) having two normally open contacts 247 (1.R.1) and 248 (1.R.2) and one normally closed contact 235 (1.R.3) is controlled by normally open push button 210a. Said relay 246 (1.R) is held or energized and its normally open contact 247 (1.R.1) is closed, and its other contact 248 (1.R.2) is closed. A three-contact relay 229 (2.R.) likewise has two normally open contacts 230 (2.R.1) and 231 (2.R.2) and one closed contact 232 (2.R.3). The relay 229 (2.R.) has normally open push button 210b. A three-contact relay 241 (3.R) has two normally open contacts 249 (3.R.1) and 250 (3.R.a). Said relay 241 (3.R) has a normally open push button 210c. A three-contact relay 240 (4.R) has two normally open contacts 251 (4.R.1) and 252 (4.R.2). Said relay 240 (4.R.) has a normally open push button 210d. A single contact relay 238 (5.R) has single normally open contact 239 (5.R.1). It has no push button as it is the maximum automatic controlled cut. Uncontrolled manual long cut may be provided as hereinafter described.

*Mode of operation*

Part of the mode of operation of the device embodying my invention is set forth above in connection with the description of the construction of the same. Other portions of the mode of operation will now be set forth.

Figure 11:
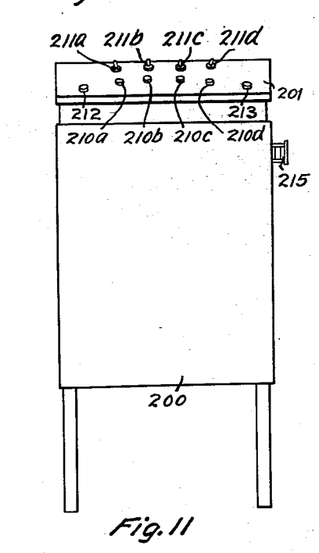
Fig 11 is a view in elevation of the control box.
Figure 12:
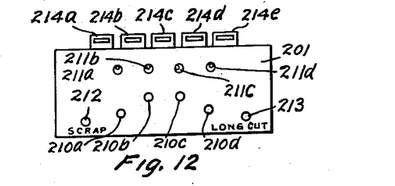
Fig. 12 is a plan view of the panel of the control box.
Figure 13:
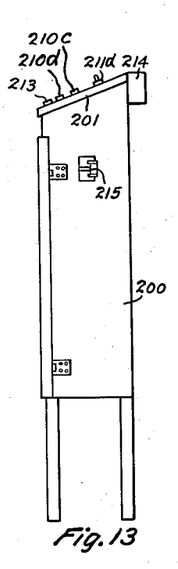
Fig. 13 is a side view of the control box shown in Fig. 11.
Figure 14:
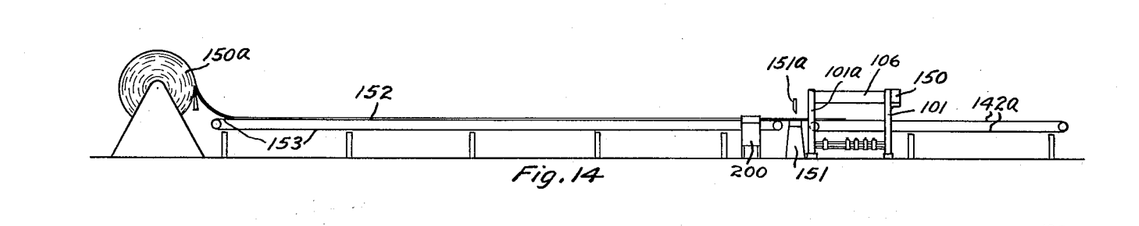
Fig. 14 is a schematic view showing general arrangement and location of the peeler log lathe, in-bear belt or tray, control box, clipper knife, electronic control mechanism and off-bear belt.

On the control box 200 is a panel 201 having a set of normally open push buttons 210a, 210b, 210c, 210d, preferably disposed in an arc for the convenience of operation of the operator's fingers, and a set of toggle switches 211a, 211b, 211c and 211d. To the left is a double contact button 212 marked "scrap" and on the right is a normally closed single contact button 213 marked "Long Cut." At the top of the panel are counters 214a (1.C), 214b (2.C), 214c (3.C), 214d (4.C) and 214e (5.C) corresponding to the push buttons 210a, 210b, 210c and 210d and corresponding to the toggle switches 211a, 211b, 211c and 211d—the fifth cut, namely 48" (Number 48" being used for illustration) is always automatic and therefore requires no control button but does have its counter 214e (5.C). At the end of the control box 200 there is a disconnecting double pole switch 215 on main supply lines 192 (L.1) and 196 (L.2) which may be employed to disconnect the mechanism entirely from the electric supply source. Secondary line 206 (L.3) has manually operated toggle switches 211a, 211b, 211c and 211d.

In starting up the machine (all adjustments have been made for light beams for predetermined cut dimensions required, as for example, 12", button 210a, 24", button 210b, 32", button 210c, 36″, button 210d and 48″, all widths of veneer pieces), the following operations take place:

The double pole contact switch 215 is closed thereby energizing main line 192 (L.1) and main line 196 (L.2), and a minute is allowed to elapse for the photoelectric cell 150 to become heated. This operation (since all light circuits are normally closed and selective operations are achieved by interrupting the light circuits beyond the selected light, if less than a 48″ cut, that is maximum cut, is required) has turned on all five lights, 143d (1.L), 143c (2.L), 143b (3.L), 143a (4.L) and 143 (5.L), all of which light beams are focused on the photoelectric cell 150 and the energized cell 150 has energized photoelectric relay 220 (P.E.) and changed its contact 221 (P.E.1) to contact 222 (P.E.2). The energy source from main source line 192 (L.1) and main source line 196 (L.2) is connected through relay 205 (A.R.) which has two normally open contacts 204 (A.R.1) and 223 (A.R.2). Contact 204 (A.R.1) acts as a holding contact for relay 205 (A.R.) subject to interruptions by the limit switch 198 (L.S.1) which occurs when the said switch momentarily opens and when the knife reaches the bottom of its stroke. This interruption serves to release relay 205 (A.R.) and its associated contacts to prevent knife 151a making a double cut or causing knife 151a to act continuously. While contact 204 (A.R.1) is so acting as a holding contact, contact 223 (A.R.2) has become a "cocked" contact, i. e., closed contact, but unenergized as the photoelectric relay switch 220 (P.E.) is contacting contact 222 (P.E.2) as stated above.

During the period described above, the knife 151a is inoperative, that is, is in elevated position. For illustration, to show operation of the knife 151a, we will first take (that is, press) the "scrap" button 212 which is normally closed in series in counter line 224 (L.5). By depressing the "scrap" button 212 counter line 224 (L.5) is interrupted and a through contact is made from supply line 192 (L.1) and supply line 196 (L.2) through the normally open two contact relay 225 (S.R.)—the "long cut" button 213 being normally closed. The relay 225 (S.R.) has two normally open contacts 191 (S.R.1) and 195 (S.R.2). When the "scrap" button 212 is pressed then contact 191 (S.R.1) and contact 195 (S.R.2) are closed by reason of energizing relay 225 (S.R.) allowing current to flow through the selected solenoid 188 right or 189 left—the right and left referring to the right or left hand end of the draw bar 160 of the clipper mechanism 151. This selection depends upon the position of the draw bar 160. When it is in "left" position, then the reversing switch 197 (L.S.3) is in closed position (that is, by the upward pressing of arm 227 by projecting platform 209 on draw bar 160). When draw bar 160 is to the "right" the reversing switch 194 (L.S.3) takes a closed position. The above "scrap" operation is independent of the light circuits and is provided as a manual operation to enable the operator to clip out an impaired or defective portion of the veneer sheet which may be of varied dimensions, providing one cut by knife 151a for each momentary contact of the button.

Figure 16:
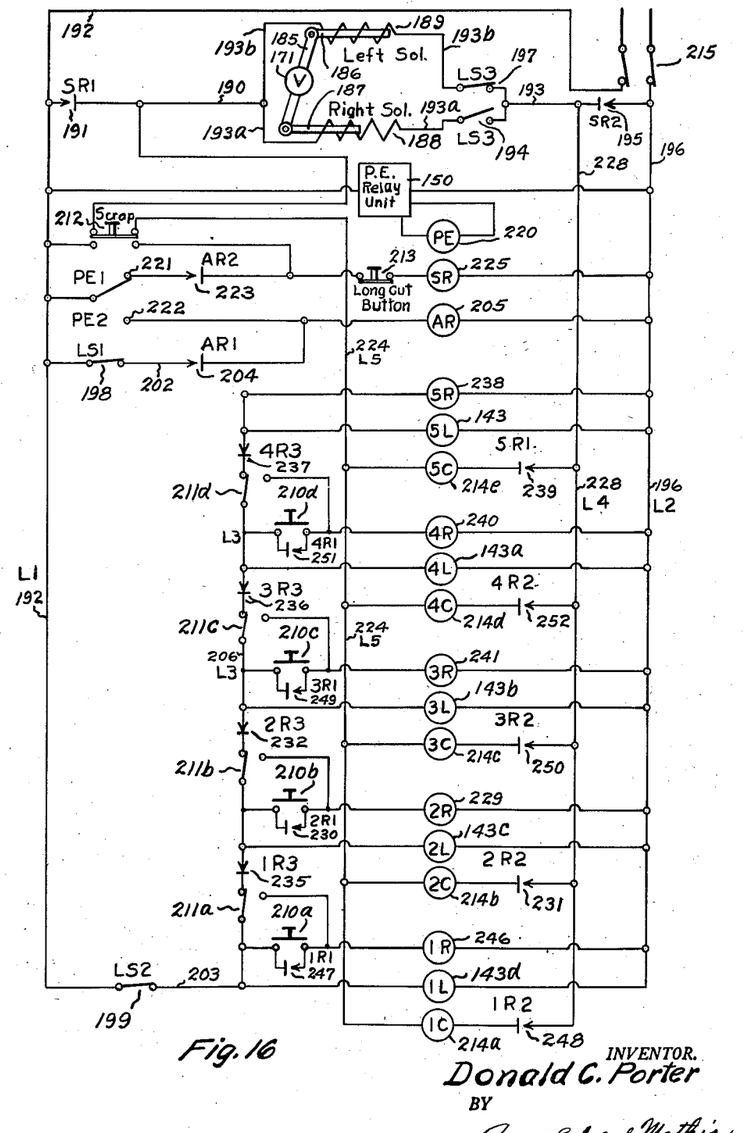
Fig. 16 is a view of the electrical wiring diagram mostly contained in the control box.

When this "scrap" button 212 was depressed then the relay 225 (S.R.) was closed as respects contact 191 (S.R.1) and contact 195 (S.R.2), and it will be assumed that the left solenoid 189 was the one to be operated as illustrated on wiring diagram, Fig. 16, by reversing switch 197 (L.S.3) which shows said switch 197 (L.S.3) in closed position, and the knife 151a made a cut because when the left solenoid 189 was operated it rotated the four-way valve 171 so that air pressure in cylinder 168 caused the piston 167 to force the draw bar 160 to the opposite right direction as did also the air pressure in cylinder 164. In doing so the knife 151a descended, made a clip and returned to elevated position with draw bar 160 to the right. When the "scrap" button 212 was depressed the counter circuit 224 (L.5) was disconnected because it was not desired to keep any record of the number of scrap pieces.

*Example illustrating manual operation*

This means that the veneer sheet has good material followed by defects. For illustration, the operation will be described for cutting pieces of veneer 24″ wide, meaning thereby pressing push button 210b, and indicating a similar operation for cutting a 36″ wide piece, which means operating push button 210d, and automatically cutting a piece 48″ wide, which requires no button depression. For such manual operation all toggle switches 211a, 211b, 211c, and 211d are manually moved into closed position in secondary line 206 (L.3) which will give a maximum cut of 48″ if no further manual actuation of the buttons 210a, 210b, 210c and 210d is performed.

For a 24″ cut the following is the procedure:

Depress push button 210b. This button closes the circuit to the relay 229 (2.R) between secondary line 206 (L.3) and main supply line 196 (L.2). Relay 229 (2.R) has two contacts normally open 230 (2.R.1) and 231 (2.R.2) and normally closed contact 232 (2.R.3). When relay 229 (2.R) was energized by depressing button 210b contact 231 (2.R.2) is closed, which is the counter circuit, but is unenergized until contact 191 (S.R.1) and contact 195 (S.R.2) are closed at the time of clipping by the knife 151a. When contact 230 (2.R.1) is closed it becomes a holding contact and replaces the depressed button 210b and contact 232 (2.R.3) in line 206 (L.3) is opened thereby de-energizing all lights beyond 143c (2.L). Thus lights 143d (1.L) and 143c (2.L) have their beams concentrated and reflected upon photoelectric cell 150 thereby energizing the cell relay 220 (P.E) and causing the closing of contact 222 (P.E.2), thereby energizing relay 205 (A.R.) allowing current to flow from main supply line 192 (L.1) across to supply line 196 (L.2), and thus closing contact 204 (A.R.1) acts as a holding contact for relay 205 (A.R.) and contact 223 (A.R.2) is in series with relay 225 (S.R), but is inoperative until relay 220 (P.E) of the photoelectric cell unit 150 is de-energized by the advancing sheet of veneer 152, Fig. 1, which cuts off the light beam.

All this occurs as follows, referring to the wiring diagram, Fig. 16:

As the flow of the veneer sheet 152 interrupts lights 143d (1.L) and 143c (2.L) progressively (that is, they both have to be covered), the photoelectric cell 150 becomes darkened and de-energized which causes the photoelectric cell relay 220 (P.E.) to close contact 221 (P.E.1)—normally open contact 223 (A.R.2) having been previously closed by the light energized photoelectric cell 150 as above explained—which now allows current to flow from main line 192 (L.1) through contact 221 (P.E.1), that is, closed 221 (P.E.1), through closed contact 223 (A.R.2) thereby energizing relay 225 (S.R.) which is connected with main line 196 (L.2). Relay 225 (S.R.) closes contacts 191 (S.R.1) and 195 (S.R.2), completing circuit from main line 192 (L.1) to main line 196

(L.2) through solenoid either right 188 or left 189, as determined by reversing switches 194 (L.S.3) or 197 (L.S.3). Upon operation of said solenoid, the knife 151a under air pressure descends and at the bottom of the stroke limit switches 198 (L.S.1) and 199 (L.S.2), which are normally closed, are temporarily opened (see Fig. 10 which shows that when the draw bar 160 descends it leaves the arms 242 and 243 of said switches held by their stops 244 and 245 inclined in their lowest position), thereby breaking the circuit to relay 229 (2.R), and which drops out holding contact 230 (2.R.1) for relay 229 (2.R). This returns contact 232 (2.R.3) to closed position and opens contact 231 (2.R.2). Completion of the cycle (that is, raising of the knife 151a after it has momentarily descended) closes limit switches 198 (L.S.1) and 199 (L.S.2). The closing of contact 232 (2.R.3) re-energizes lights 143b (3.L), 143a (4.L) ad 143 (5.L), the beams of which lights are then reflected upon the photoelectric cell 150 as next explained.

Contact 231 (2.R.2) was closed in series with counter 214b (2.C) when three-contact relay 229 (2.R) was energized although not then energized. Counter 214b (2.C) was energized upon the closing of contacts 181 (S.R.1) and 195 (S.R.2) causing the counter 214b (2.C) to register one actuation, that is, one cut or piece of veneer by the knife 151a. The clipped veneer sheet passes ahead faster than the incoming sheet since the off-bear belt 154 runs faster than the infeed belt 153, and thus causes an opening between the leading edge of the infed sheet 152 and the trailing edge of the sheet just clipped on the off-bear feed 154. Thereupon one of the five lights 143 to 143d inclusive is permitted to pass through the opening 234, Fig. 1, in the table 142, and the opening provided between the trailing edge of the clipped piece and the slower advancing edge of the sheet 152. Such light re-energizes the photoelectric cell 150 which results in holding relay 220 (P.E) with its contact 222 (P.E.2) in closed position, and this in turn re-energizes relay 205 (A.R.). Thereupon the knife 151a is in an inoperative position until the selected light beams and those ahead of it are again interrupted. Let it be remembered that no long as any one of the light beams 143, 143a to 143d inclusive is reflected upon the photoelectric cell 150 the knife is held in an inoperative position.

As stated, the above describes the cycle of operation for cutting a 24" sheet, since the operation of light 143c (2.L) is the second light which has been assumed to be adjustably mounted with respect to rods 128 and 129, Fig. 2, to provide a 24" width for the piece of veneer.

For cutting a 36" sheet, push button 210d is operated and a similar cycle of operations results—light 143a (4.L) being interrupted by the advancing edge of the sheet 152 in this instance.

For cutting a 48" sheet, all lights 143d (1.L), 143c (2.L), 143b (3.L), 143a (4.L) and 143 (5.L) are normally automatically on, and contacts 235 (1.R.3) and 232 (2.R.3), contact 236 (3.R.3) and contact 237 (4.R.3) are all normally closed and therefore electric energy from the main line 192 (L.1) and main line 196 (L.2) is in series with relay 238 (5.R), which relay 238 (5.R) controls only one normally open contact, namely, 239 (5.R.1), and this is counter contact 214e (5.C). The above is automatic operation for the 48" width of clipped veneer.

For automatic operation for any other size of sheet, for example, a 36" size, to provide automatic continuous operation for this 36" size as a maximum, toggle switch 211d is opened in line 208 (L.3) and closed in series with relay 240 (4.R). Thereupon, obviously, all operation above relay 240 (4.R) is cut off and automatic continuous operation for the sheet 36" maximum is similar to the described operation for the 48" sheet automatic operation.

"Long cut" operation, which means cutting sheets of sizes greater than 48" and of a size cut to approximate desired lengths which are free of defects, normally closed button 213 "Long Cut" (see Fig. 11) is pressed and held down. This opens circuit to relay 225 (S.R.) making it inactive even though light beams are interrupted, and when the sheet 152 has reached the desired length all light beams will be interrupted and by removal of the finger from depressed button 213 the circuit to relay 225 (S.R) is closed and normal clipping by the knife mechanism 151a results. "Long cut" operation is very seldom desired but is provided by the device of my invention to give the widest range of operation. The "long cut" operation will operate the 48" counter 214e (5.C) because the closing of circuit to the double normally open contact relay 225 (S.R) closes contact 191 (S.R.1) and contact 195 (S.R.2) completing the circuit to counter line 224 (L.5) (since "scrap" button 212 is normally closed on this circuit), and the closing of contact 195 (S.R.2) completes the circuit through line 228 (L.4) to main supply line 196 (L.2).

Respecting Fig. 15: Since the light housing 146, Fig. 8, is rotatively adjustable, it is possible to obtain widths of clipped pieces plus or minus dimension from that dimension which would be normally provided by the light when directed to its corresponding mirror. Other widths of cuts can be obtained by slidingly adjusting the arms along bars 128 and 129. Due to the necessary width of stroke of each of the arms 132 to 136 inclusive, it is impossible to obtain cuts of the veneer sheet 152 closer than about 2" when the light beams of their respective light means 143 (5.L), 143a (4.L), 143b (3.L), 143c (2.L) and 143d (1.L) are directly directed to their corresponding reflected mirrors 117 to 121 inclusive. If it is desired to provide for an intermediate width, i. e., for two cuts less than two inches apart, such may be provided as follows: Light means 143b (3.L) is rotatively adjusted until the light beam intercepts top of off-bear table 142 at the desired distance from knife 151a, as 40½ inches. Then reflector mirror 120 is adjusted to receive and reflect the beam to the photoelectric cell or unit 150. If the second cut desired is 39 inches, then light means 143c (2.L) is crossed to intercept the top of the table 142 at 39 inches from the knife 151a and reflector mirror 119 is adjusted to receive and reflect the beam of light upon the prism of the photoelectric cell 150. Thus we are able to get two cuts as close together as 254, that is, 1½ inches or even less. This is set forth to show the range of utility of the device embodying my invention.

Thus it is seen that the control mechanism of my invention provides for exceedingly accurate and precise operation as to metered dimension of product. It is to be remembered that the veneer sheet may vary in thickness depending upon the particular cut that is desired, and these varying cuts may be run with my control mechanism without any change in the same.

Moreover, these cuts may be exceedingly thin and yet they may be accurately metered by the control mechanism of my invention without any possible injury to the same.

Furthermore, the veneer sheet may be more or less wet or dry and yet it makes no difference with the operation of the control mechanism of my invention.

The sheets when very thin are very light, and therefore provide very little or no stiffness, all of which makes no difference with my control mechanism.

Furthermore, it is to be remembered that the veneer sheet may not lie flat upon the table and have areas of the same which are raised, and yet this does not have any substantial effect upon the control mechanism embodying my invention.

The fact that there is no physical contact of any mechanism with the advancing sheet to either retard it or to distort it, renders the device embodying my invention of great advantage.

One particular advantageous feature of my invention, among those elsewhere listed herein, is that a plurality of beams of light may be deflected simultaneously upon the photoelectric cell unit and over a portion of their path to form a composite beam of light without any disadvantage, but in fact, provide for a greater intensity of light which insures by so much a positive action of the photoelectric cell unit. Having a plurality of light reflecting or deflecting means makes it possible to utilize a single photoelectric relay unit and thereby reduces the chances of air in measurement and tuning and also provides for economical construction. The plurality of lights and deflecting means focused upon a single photoelectric relay unit provides for a plurality of dimensional selections each independent of the other yet actuating a single relay.

I claim:

1. An electronic control mechanism for a veneer clipper comprising a mounting frame; a photoelectric cell-relay unit mounted on said frame; a plurality of light deflecting means mounted on said frame; a plurality of lamp mounting arms supported by said frame; a lamp mounted in the outer end portion of each of said lamp mounting arms, whereby the light beam of each of said lamps may be directed upon said light deflecting means and then directed to said photo-electric cell-relay unit; a product conveyor supporting table extending across the path of said light beam, said table having an opening through which said light beam may pass; a veneer clipper means; a pneumatic pressure means operatively connected to said clipper means; a valve means for controlling said pneumatic pressure means; a solenoid means for controlling said valve means; and electric circuit means connecting said photocell-relay unit to said solenoid means whereby the advancing edge of a veneer sheet on said conveyor table may intercept the light beam from said lamps and thereby control the operation of said clipper means through the photo-electric cell relay unit.

2. In an automatic electronic control mechanism, a mounting means therefor, a photo-electric cell mounted adjacent said mounting means, a light collector selector means comprising a light collector and selector housing of oval form cross sectionally considered with a fixed longitudinal slot disposed in said housing for receiving a beam of light therethrough; a circular end brake mounting member formed on each end portion of said houing member; and light deflecting means adjustably mounted in offset relation in said light collector selector housing, whereby the light beams readily may be focused on said photoelectric cell.

3. In an electronic control mechanism comprising a clipper mechanism; an infeed conveyor belt terminating adjacent said clipper mechanism; an off-bear conveyor mechanism disposed adjacent said clipper mechanism and to the end of said infeed conveyor mean, said off-bear conveyor means running at a speed greater than said infeed belt mechanism, said off-bear conveyor having an opening through which a light beam may pass whereby said greater speed provides for separating the pieces of clipped veneer thereby permitting the functioning of one or more of the light beams to insure non-operation of the clipper until a predetermined light beam is intercepted; and an electronic clipper control means disposed adjacent said clipper means.

4. In an electronic control mechanism for a veneer clipper comprising a mounting frame; a plurality of light deflecting members mounted on said frame; a plurality of electric lamps adjustably mounted whereby a beam of each may be directed upon said light deflecting members; a relay of a photoelectric cell unit in a normally closed circuit subject to being opened by the cutting off of said reflected light of a predetermined lamp; a clipper mechanism; and a circuit electrically connecting said photoelectric cell unit with said clipper mechanism.

5. An electronic control for metering and subdividing mechanism for a sheet of veneer comprising a clipper mechanism; actuating means for said clipper mechanism; belt conveyor means for advancing a sheet of veneer in association with said clipper mechanism; electric lamps providing light beams disposed in the path of said advancing sheet of veneer; a photoelectric relay unit responsive to said light beam whereby the energizing of the unit maintains said actuating means inoperative, and intercepting the light beam by the advancing edge of the sheet of veneer de-energizes the unit, thereby causing the actuating means to operate the clipper; a control box having push button and toggle electric switches; and electric circuits operatively interconnecting said clipper mechanism, photoelectric relay unit, electric lamps and control box.

6. In an electronic control mechanism for subdividing a sheet of veneer into pieces of varying sizes, a clipper mechanism; an infeed conveyor means for a veneer sheet terminating adjacent said clipper mechanism; an off-bear conveyor means for pieces of clipped veneer running at a speed greater than that of the infeed conveyor and receiving the clipped pieces from said infeed conveyor, said off-bear conveyor means having an opening longitudinally therein; a photoelectric relay unit; a plurality of lamps disposed in spaced relation in the direction of the travel of the veneer sheet, said lamps projecting light beams through the opening in said off-bear conveyor means; a plurality of light reflecting members disposed to receive said light beams and reflect them upon the photoelectric relay unit; a control box having push button switches and toggle switches disposed across main supply lines; an electric circuit having a first main line and a second main line; a circuit extending across from said main first supply line to said second main line, including therein operative connections to said clipper mechanism; a relay control circuit connected to said clipper means extending across said main lines; a photoelectric relay unit connected across said main supply lines; a plurality of lights in circuits extending from said first main line to said second main line; toggle switches in said lamp circuits and relay circuits controlling the number of same connected; and a plurality of relay contacts in said relay and light circuits whereby the number of operations of the clipper mechanism for each lamp may be controlled.

7. In an electronic control mechanism for metering and subdividing mechanism for a sheet of veneer an electric circuit having a first main supply line and a second main line; a circuit extending from said first main supply line to said second main line, including therein connections to a device to be controlled; a circuit extending from said first main supply line to said second main line including a photoelectric relay unit; a plurality of interlocking relays disposed in a circuit extending across said first main supply line and said second main line whereby the flow of electrical current in said lines may be selectively controlled; a plurality of push buttons controlling said interlocking relays whereby the treating step determining the product may be controlled; a plurality of relay operated contacts replacing manual operation of said push buttons; a plurality of photo-electric relay units operating lights in circuits extending from contacts of said interlocking relays to said second main line; a veneer clipper; an electrical actuating device connected to a regulating element of said clipper; a photoelectric relay unit operated by said lights controlled by said interlocking relays; first and second actuating relays in circuits extending from said first supply line to said second supply line, said actuating relays being energized through contacts of the photoelectric cell relay and selectively controlled by the contacts of said photoelectric relay, said first actuating relay setting contact for operation of said second actuating relay when selected photoelectric relay closes contacts in circuit to said electrical actuating device; and limit switches operated by said clipper for de-energizing the interlocking relays and actuating relays and re-energizing light circuits through said interlocking relay contacts whereby automatic operation of the controlling relays is timed with the operation of the clipper for successive operation.

8. An electronic control for metering and subdividing mechanism for a sheet of veneer comprising a clipper mechanism; actuating means for said clipper mechanism; belt conveyor means for advancing a sheet of veneer in association with said clipper mechanism; electric lamps providing light beams disposed in the path of said advancing sheet of veneer; a photo-electric relay unit responsive to said light beam whereby the energizing of the unit maintains said actuating means inoperative, and intercepting the light beam by the advancing edge of the sheet of veneer de-energizes the unit, thereby causing the actuating means to operate the clipper; a control box having electric switches; and electric circuits operatively interconnecting said clipper mechanism, photo-electric relay unit, electric lamps and control box.

9. In an automatic electronic control mechanism a photo-electric cell having a prism whereby light may be received for activating said cell; a mounting means therefor; a light collector housing having a fixed longitudinal slot through which a beam of light may pass and having its longitudinal axis coinciding with the focal point of the photo-electric cell prism; a plurality of lamps providing beams of light for actuating said photo-electric cell; and a plurality of light deflecting means adjustably mounted in offset relation in said light collector housing whereby the light beams readily may be focused on said photoelectric cell.

10. In an electronic control mechanism, off-bear product conveyor parallel mounted belts; upright mounting posts adjacent said belt; lamp arm supporting means vertically adjustable adjoining said posts; lamp arms adjustably mounted lengthwise of and beneath said conveyor belts; and lamps carried by said arms whereby a beam of light may be directed between said conveyor belts at points spaced lengthwise of said conveyor belts.

11. In an electronic control mechanism, off-bear product conveyor parallel mounted belts; upright mounting posts adjacent said belt; lamp arm supporting means vertically adjustable adjoining said posts; lamp arms adjustably mounted lengthwise of and beneath said conveyor belts; light deflector means disposed above and lengthwise of said conveyor belts; and lamps carried by said arms, which lamps are adjustable in vertical and horizontal planes, whereby beams of light may be projected between said conveyor belts selectively to one or more of said deflector means whereby beams of light may be projected between said conveyor belts of less distance than the spaced relation of the said lamps.

12. An electronic control mechanism comprising a mounting frame; two spaced apart parallel product conveying beds disposed adjacent said frame; a light deflector housing mounted on said frame on one side of said conveyor beds, a photoelectric cell relay unit mounted in one end of said housing; a plurality of light deflecting means adjustably mounted in said housing, said deflecting means being focusable upon said photo-electric cell in providing for simultaneously directing light beams upon said cell; and a plurality of lamps on the side of said conveyor means opposite to said housing, said lamps being adjustable to direct their light beams directly and angularly through the opening between said conveyor beds to deflecting means, whereby the number of selected excitations of said photo-electric cell may be increased for a given spacing of the lamps.

13. In an electronic control mechanism, a mounting frame; a photo-electric cell relay unit mounted on said frame; a plurality of light deflecting means mounted on said frame; a plurality of lamp mounting arms supported by said frame, said arms having a cradle adjustably rotatably mounted in one end portion of said arm; and a lamp housing rotatably mounted on said cradle in a plane at right angles to the rotatable motion of said cradle.

14. In an automatic electronic control mechanism, a mounting means; a photo-electric cell mounted adjacent said mounting means; a light collector-selector means comprising a light collector and a selector housing of oval form, cross-sectionally considered, with a fixed longitudinal slot disposed in said housing for receiving beams of light therethrough; and light deflecting means adjustably mounted in off-set relation in said light collector-selector housing.

15. In an electronic control mechanism for subdividing a sheet of veneer into pieces of varying sizes, a clipper mechanism; an infeed conveyor means for a veneer sheet terminating adjacent said clipper mechanism; an off-bear con-veyor means for pieces of clipped veneer running at a speed greater than that of the infeed conveyor and receiving the clipped pieces from said infeed conveyor, said off-bear conveyor means having an opening longitudinally therein; a photo-electric relay unit; a plurality of lamps disposed in spaced relation in the direction of the travel of the veneer sheet, said lamps projecting light beams through the opening in said off-bear conveyor means; a plurality of light reflecting members disposed to receive said light beams and reflect them upon the photo-electric relay unit; a control box having electric switches across the main supply lines; electric circuit having a first main line and a second main line; a circuit extending across from said main first supply line to said second main line, including therein operative connections to said clipper mechanism; a relay control circuit connected to said clipper means extending across said main lines; a photo-electric relay unit connected across said main supply lines; a plurality of lights in circuits extending from said first main line to said second main line; toggle switches in said lamp circuits and relay circuits controlling the number of same connected; and a plurality of relay contacts in said relay and light circuits, whereby the number of operations of the clipper mechanism for each lamp may be controlled.

DONALD C. PORTER.

REFERENCES CITED

The following references are of record in the file of this patent:

UNITED STATES PATENTS

| Number | Name | Date |
|---|---|---|
| 1,913,153 | DeSalardi | June 6, 1933 |
| 1,962,467 | Sholkin | June 12, 1934 |
| 1,991,423 | Shaver | Feb. 19, 1935 |
| 1,998,950 | Cockrell | Apr. 23, 1935 |
| 2,029,919 | Fuller | Feb. 4, 1936 |
| 2,037,191 | Backer | Apr. 14, 1936 |
| 2,038,452 | Sharkey | Apr. 21, 1936 |
| 2,078,800 | Juchter | Apr. 27, 1937 |
| 2,080,292 | Webber | May 11, 1937 |
| 2,106,612 | La Pierre et al | Jan. 25, 1938 |
| 2,147,617 | McCleery | Feb. 14, 1939 |
| 2,272,097 | Smith | Feb. 3, 1942 |
| 2,379,682 | Colucci | July 3, 1945 |
| 2,394,324 | Miller | Feb. 5, 1946 |
| 2,394,466 | Muddiman | Feb. 5, 1946 |
| 2,395,181 | Hags | Feb. 19, 1946 |
| 2,408,313 | Hunter | Sept. 24, 1946 |
| 2,448,830 | Robbins | Sept. 7, 1948 |
| 2,458,612 | Luzzatto | Jan. 11, 1949 |